Figure 1:
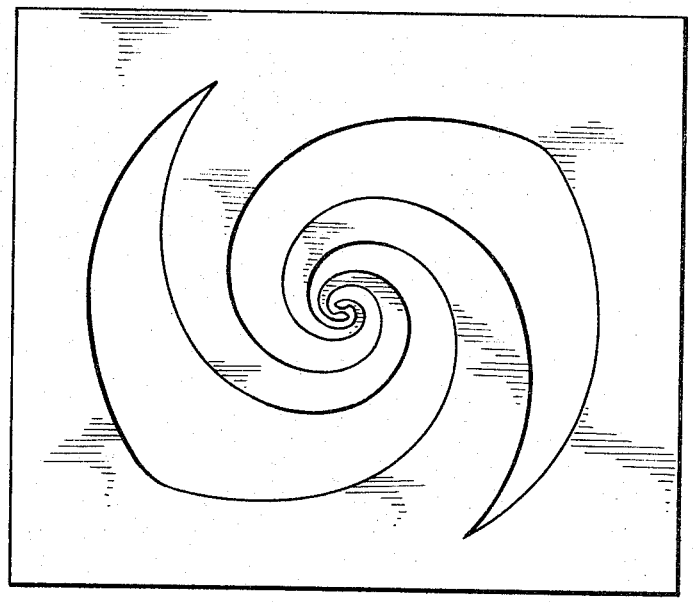

March 28, 1967  A. R. BARRINGER  3,311,914
METHOD AND APPARATUS FOR INVESTIGATING STRUCTURAL
GEOMETRY OF A REMOTE REFLECTING BODY
Filed March 12, 1965  3 Sheets-Sheet 1

INVENTOR.
ANTHONY R. BARRINGER
BY Rogers & Bereskin
PATENT AGENTS

March 28, 1967 A. R. BARRINGER 3,311,914
METHOD AND APPARATUS FOR INVESTIGATING STRUCTURAL
GEOMETRY OF A REMOTE REFLECTING BODY
Filed March 12, 1965 3 Sheets-Sheet 2

INVENTOR.
ANTHONY R. BARRINGER
BY Rogers & Bereskin
PATENT AGENTS

VISUAL PRESENTATION

INVENTOR.
ANTHONY R. BARRINGER
BY Rogers & Bereskin
PATENT AGENTS

United States Patent Office
3,311,914
Patented Mar. 28, 1967

3,311,914
METHOD AND APPARATUS FOR INVESTIGATING STRUCTURAL GEOMETRY OF A REMOTE REFLECTING BODY
Anthony Rene Barringer, Willowdale, Ontario, Canada, assignor to Barringer Research Limited, Rexdale, Ontario, Canada, a corporation
Filed Mar. 12, 1965, Ser. No. 439,288
13 Claims. (Cl. 343—17.2)

This invention relates to a method and an apparatus for investigating structural geometry of a remote reflecting body, and in particular to an airborne system of terrain analysis and ice thickness measurement.

The invention involves the propagation of a frequency modulated pulse having broad frequency dispersion towards a target (i.e. a structural geometry or other reflecting body) and the analysis of the spectrum or signature of the pulse after reflection to thereby identify or estimate unknown target conditions which determine the signature of the reflected pulse. Conditions such as soil moisture content, soil layering and ice thickness, for example, cause changes in phase and amplitude of the frequency components in the spectrum of a reflected pulse. Since the signature of the reflected pulse is uniquely determined by the target conditions, by analyzing the signature the target conditions may be estimated, as will be described.

An important application of the invention is in estimating terrain trafficability, for example for locating satisfactory aircraft landing areas or safe routes for vehicles through unknown terrain. A parameter of prime importance in estimating trafficability is soil moisture content, which is related to the dielectric constant of the soil. The radio frequency reflectivity of soil is a function of the soil dielectric constant, but it has been found that soil layering can cause serious errors in apparent reflectivity measurements if the reflectivity measurements are carried out with pulses of single frequency or of relatively narrow frequency dispersion. These errors are believed to be caused by cancellation effects caused by soil layering of thicknesses corresponding to one quarter wavelength of the pulse frequency. Such cancellation has the effect of reducing the apparent reflectivity of the soil. By using pulses of broad frequency dispersion, according to this invention, it is possible to detect the presence of layering by analyzing the reflection signatures of the reflected pulses, and also to estimate the moisture content of the upper surface layers by selecting meaningful frequency components in the analysis. Layering is revealed by the presence of a minimum or minima in the spectrum of the received pulse. As will be described, frequency analysis is preferably performed by feeding the received reflected pulses through a comb filter (e.g. a bank of radio frequency amplifiers tuned to different frequencies in the spectrum of the pulses) and by examining the outputs of the amplifiers to ascertain the frequencies at which maxima and minima occur. These maxima and minima frequencies indicate half wavelength and quarter wavelength distances, respectively, between the reflecting surfaces. Further analysis of the relative amplitudes of the reflections, when corrected for flying height, provides information from which the soil dielectric constant and hence soil moisture content can be estimated.

An object of the invention is therefore to provide a system for rapidly investigating structural geometry of a remote reflecting body.

Another object of the invention is to provide an airborne system for rapidly profiling terrain trafficability.

Another object of the invention is to provide a system for rapidly profiling the thickness of ice.

Another object of the invention is to generate a frequency modulated pulse of short duration having a broad dispersion of frequency components in the range between about 50 to 400 megacycles per second, and to provide means for automatically analyzing the signature of such a pulse after it is reflected from a target.

Figure 2:
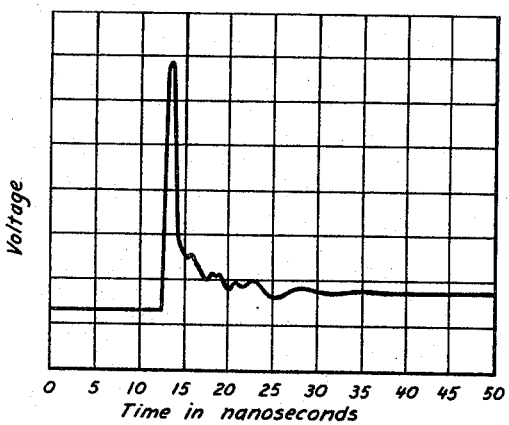
Figure 3:
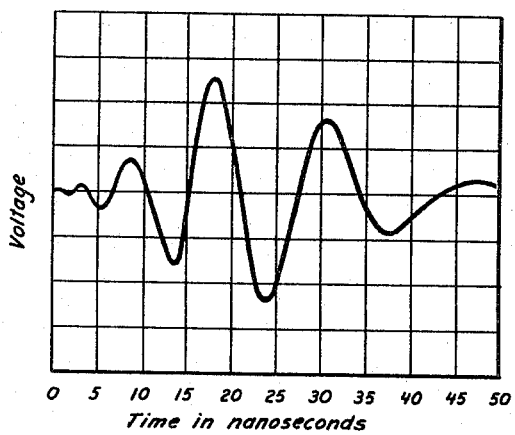
Figure 4:
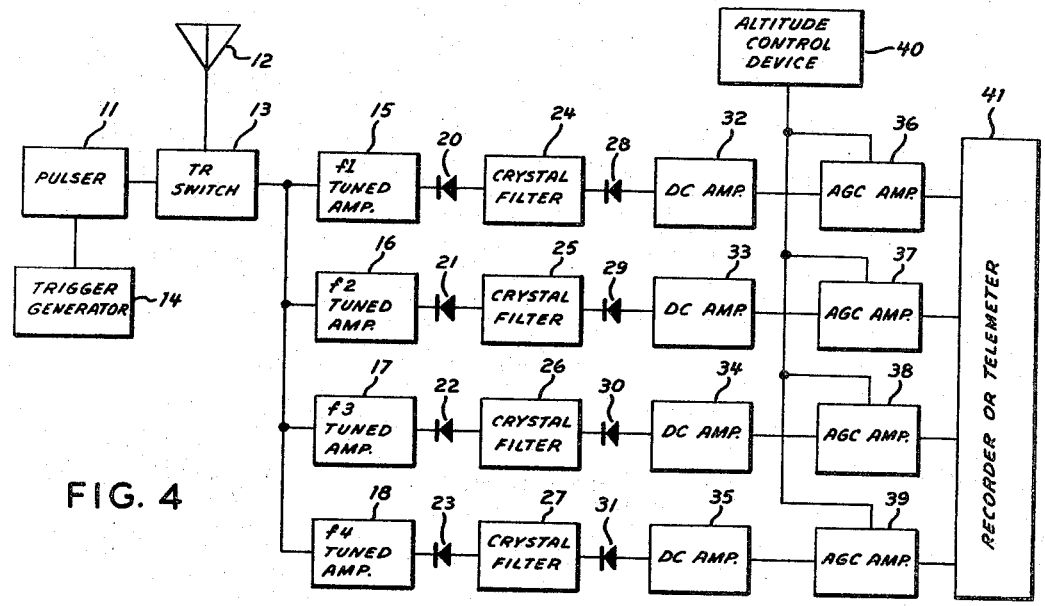
Figure 5:
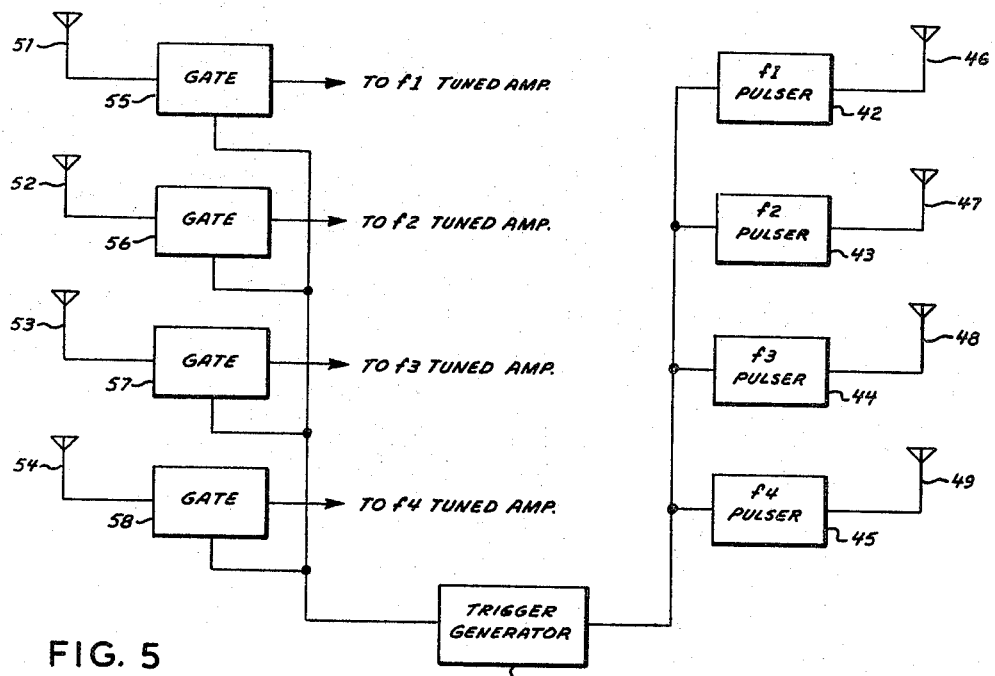
Figure 6:
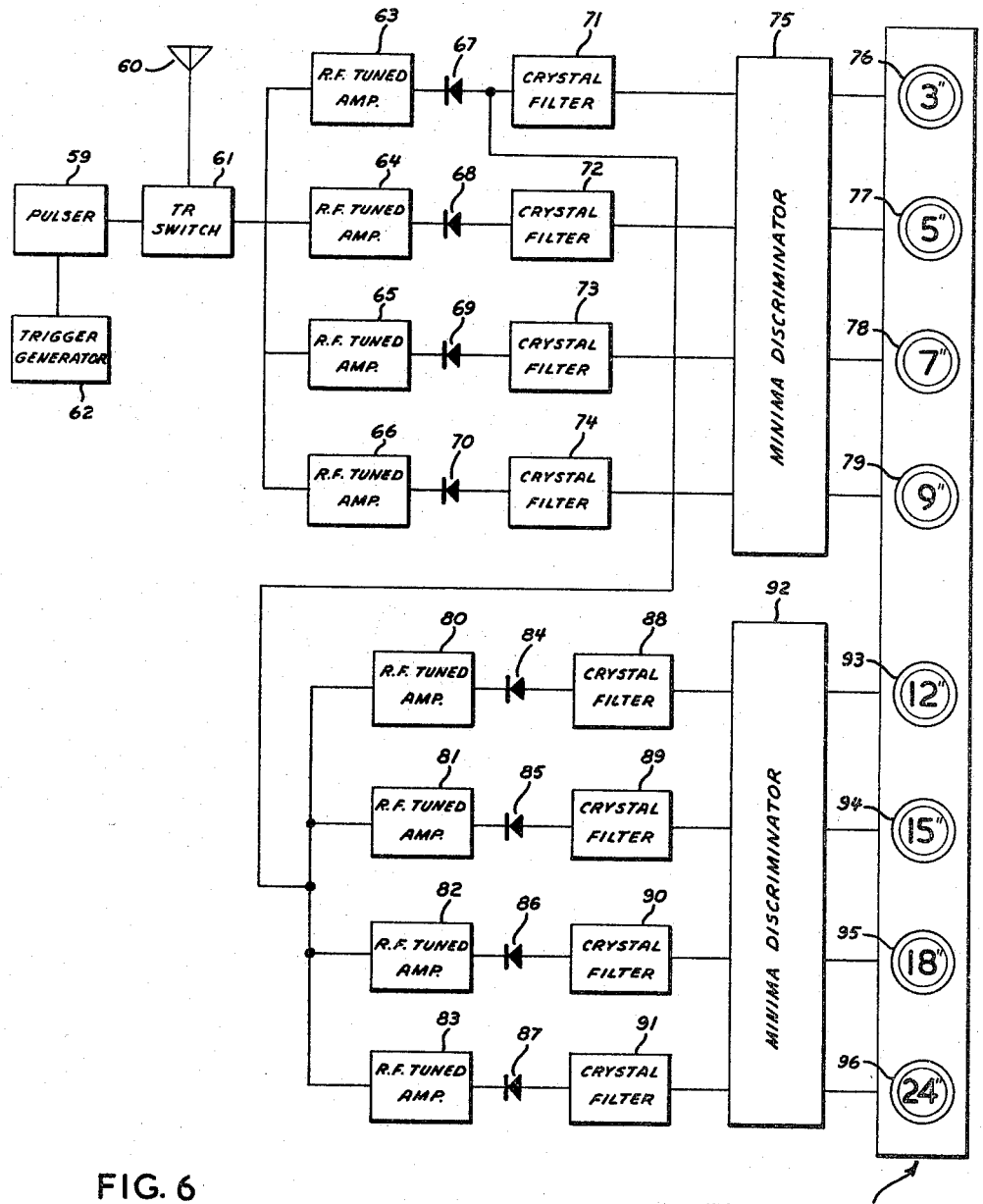

The above and still further objects and advantages of the invention will become apparent from a study of the following specification, with reference to the accompanying drawings which illustrate preferred forms of the invention, and in which:

FIG. 1 is a perspective view of a wide band antenna of log planar spiral configuration;
FIG. 2 is a graphical view of a typical voltage step function used for shock exciting an antenna;
FIG. 3 is a graphical view of a frequency modulated pulse of broad frequency dispersion, generated by shock exciting a wide band antenna with a voltage step function;
FIG. 4 is a block diagram of a terrain analysis system;
FIG. 5 is a block diagram of a system for generating and receiving frequency modulated pulses of broad frequency dispersion using a plurality of single frequency pulsers that are triggered contemporaneously, and
FIG. 6 is a block diagram of a simple ice thickness measurement system.

Introduction

As indicated above, it is proposed to propagate a frequency modulated pulse of relatively broad frequency dispersion towards a target, and to analyze the signature of the pulse after reflection to thereby identify unknown structural geometry or target conditions which determine the signature of the reflected pulse. The following description will include a discussion of methods for generating suitable frequency modulated pulses, and, by way of example, descriptions of terrain analysis and ice thickness measurement systems.

Pulse generation

The optimum range of frequencies of the pulses transmitted towards a target depends upon the nature of the target. For example, pulses having frequency components in the range between about 50 to 400 megacycles per second (mc./s.) are preferred for terrain analysis, for the following reasons.

Studies made of reflectivities from two layer targets indicate that interference effects caused by layering can drastically change the shape of a reflected pulse. If the pulse is of broad frequency dispersion, however, a peak reading representing maximum reflectivity will be obtained somewhere in the spectrum, and a minimum reading will also be obtained provided the frequency spectrum includes a frequency corresponding to the quarter wave thickness of the soil layering. In a two layer case there will be one minimum and in a three layer case two minima, for example. As a rule of thumb, a frequency dispersion of at least about 6 to 1 is recommended, and the pulse should contain relatively low frequency components in order to achieve sufficient penetration for estimating trafficability. A practical upper frequency limit is about 400 mc./s.; limited penetration and the effects of scattering and secondary reflection render frequency components beyond 400 mc./s. less useful in dielectric constant and soil moisture measurements. At the opposite end of the frequency range, a frequency of about 50 mc./s. appears to be a practical minimum, since conduction effects begin to assume dominant importance as the frequency is lowered, so that reflectivity no longer is mainly a function of dielectric constant. There is also the problem of providing a suitable airborne antenna adapted for impulse excitation at low VHF frequencies, because of the size of such antennas.

These considerations suggest that, for terrain analysis, the frequency dispersion of the pulses should be between about 50 to 400 mc./s. and it is considered that the most reliable data can be gathered from the frequency components between about 100 to 300 mc./s. The frequency components at the ends of the 100 to 300 mc./s. range may help to identify layering effects, and from this point of view they are important.

Two preferred methods of generating suitable pulses are as follows. The first consists of shock exciting a wide band antenna such as a log planar spiral (see FIG. 1) with a voltage step function having a fast rise time, for example of the order of 1 nanosecond. FIG. 2 shows a typical excitation pulse having a rise time of slightly under 1 nanosecond, and FIG. 3 shows a typical pulse that is radiated from a shock excited wide band antenna. Pulses having broad frequency dispersion and relatively short duration can be generated by this method.

Another method of generating suitable pulses consists of contemporaneously triggering a plurality of separate controllable pulsers or transmitters that are tuned to different frequencies in the desired transmitted pulse spectrum. Each pulser feeds a separate tuned antenna such as a dipole. The resultant pulses (which constitute the summation of the pulses generated by the individual pulsers) include a broad spectrum of frequency components (i.e. not only the original pulser frequencies but also many intermediate frequencies), and therefore fulfill the requirement of broad frequency dispersion. The pulser frequencies are preferably octaves, half or quarter octaves apart, depending upon the required power output, and the required frequency sweep.

The systems described below utilize a repetition of pulses of this kind, so the pulse generating apparatus should be capable of generating pulses at a constant repetition rate. A rate of 10 kilocycles per second (kc./s.) is convenient.

The duration of the pulses should be sufficiently short that they have completely died away at a time when the first components of the reflected pulses reach a receiving antenna, to avoid masking of the reflected pulses. The maximum permissible duration is of course a function of the separation between the transmitting and receiving station and the target. Flying heights of the order of 500 feet, more or less, are contemplated for the airborne systems described below, and either of these pulse generating methods can readily satisfy this requirement.

The transmitter power required is well within the capability of conventional circuits. For example, assuming a flying height of 500 feet, antenna gain (transmitting plus receiving) of 12 db, required receiver input of —40 db m. (typical video amplifier), path loss of 80 db, and a reflection loss of 10 db, the total transmitted power required for any one frequency component is only 38 db m., or less than 10 watts per frequency component. A system of having 10 frequency components, for example, would therefore require 100 watts peak power, but the average power is of course much less than this because of the short R.F. duty cycle.

*Terrain analysis*

As indicated above, a pulse of narrow frequency dispersion is believed unsuitable for terrain analysis because cancellation effects caused by layering results in reflectivities (at specific frequencies) which are only partially related to dielectric constant and moisture content. If, however, a pulse of broad frequency dispersion is used, it is possible to recognize layering effects and to estimate the moisture content of the upper surface layers. The differential ratio between maximum and minimum reflection of the different frequency components is related to the ratio between the moisture contents of the upper and lower near surface layers of the soil, and by comparing these ratios with ratios obtained from known soil conditions, the unknown soil conditions can be estimated.

FIG. 4 is a block diagram of a terrain analysis system capable of performing a simple spectrum analysis of reflected pulses. The transmitting section of the system includes a controllable pulser 11 which feeds wide band antenna 12 through a transmit/receive (TR) switch 13. The pulser 10 is triggered by a trigger generator 14, and is capable of producing step function voltages having rise times of the order of 1 nanosecond (see FIG. 2). The trigger generator 14 has a repetition rate of 10 kc./s., a convenient frequency.

Referring now to the receiving section, the antenna 12 is connected (through the TR switch) to a plurality of radio frequency tuned amplifiers 15, 16, 17 and 18 whose respective frequencies are indicated as $f1$, $f2$, $f3$ and $f4$. Although only four such tuned amplifiers are shown, it is to be understood that more amplifiers can be added to improve the resolution of the system. The frequencies to which the amplifiers are respectively tuned cover the frequency sweep of the transmitted pulses. For example, if only four amplifiers are used and the frequency sweep of the transmitted pulses is between about 50 to 400 mc./s., the respective amplifier frequencies could be 50, 100, 200 and 400 mc./s. The outputs of the amplifiers 15, 16, 17 and 18 are rectified by diodes 20, 21, 22 and 23, respectively, and are then fed through narrow band crystal filters 24, 25, 26 and 27 which are tuned to the 10 kc./s. repetition rate of the trigger generator 13. The filters 24, 25, 26 and 27 enhance the signal to noise ratio of the receiver by passing only those frequency components which are at the repetition rate. After passing through the filters 24, 25, 26 and 27 the respective signals are detected by diodes 28, 29, 30 and 31 and are amplified by D.C. amplifiers 32, 33, 34 and 35. The output voltages of all the D.C. amplifiers are adjusted to be equal in the presence of a reflection from a single layer surface so that, in effect, the power spectrum of the transmitted pulses is reasonably linear.

Automatic gain control is provided by AGC amplifiers 36, 37, 38 and 39 which are controlled by an altitude control device 40 to provide compensation for variations in signal strength caused by changes in flying height or terrain clearance. The altitude control device can comprise, for example, a conventional range tracking gate which follows the pulses reflected from the ground and generates a direct current voltage that is proportional to the delay between the transmitted and reflected pulses, and hence is proportional to the flying height. This direct current voltage can be fed through a photo electric function generator which provides an output voltage suitable for controlling the AGC amplifiers.

The output voltages of the AGC amplifiers are fed to a conventional multi-channel recorder 41 or telemeter, or else, for example, they may be scanned by a conventional electronic scanner and presented as vertical bars spaced across the face of an oscilloscope. Photographs of the oscilloscope face would provide a frequency analysis of the spectrum of the received reflected pulses.

Other more sophisticated analyses may be performed, such as automatic monitoring of the ratio between minimum and maximum signals to provide a direct indication of the presence of layered soil. Computer type circuitry could be used in conjunction with an airborne magnetic tape recording system so that detailed analyses of the signals could be made upon return to base. Obviously the complexity of the monitoring system will depend upon the degree of analysis required.

The antenna 12 serves as a combined receiving and transmitting antenna; switching is accomplished by the TR switch. The antenna may be secured to the underside of the wing of an aircraft and should be spaced from the wing by several inches. The usual precautions when dealing with pulses of fast rise time and low amplitude should be observed.

In FIG. 5 there is shown an alternative system for generating pulses of broad frequency dispersion. This system has already been generally described above, but will now be described in greater detail. Four controllable pulsers 42, 43, 44 and 45 respectively feed tuned antennas 46, 47, 48 and 49 such as dipoles, and the respective frequencies of the pulsers are indicated as f1, f2, f3 and f4. These frequencies span the required frequency range; for example, if the frequency range is 50 to 400 mc./s., the respective frequencies are preferably 50, 100, 200 and 400 mc./s. Additional pulsers of frequencies intermediate these frequencies may of course be added. Each antenna 46, 47, 48 and 49 is tuned to the frequency of the associated pulser. The pulsers 42, 43, 44 and 45 are contemporaneously triggered by a trigger generator 50a which operates at a convenient repetition rate such as 10 kc./s., and the resultant radiated pulses include not only the individual pulser frequencies in their spectrum but also the intermediate frequencies, as indicated above. The dipole antennas should be of wide band construction to reduce ringing.

The receiving antenna system of FIG. 5 includes tuned antennas 51, 52, 53 and 54 which are similar to the transmitting antennas 46, 47, 48 and 49, and each is respectively connected to gates 55, 56, 57 and 58 which are controlled by the trigger generator 50, for gating out the transmitted pulses.

From the gates 55, 56, 57 and 58 the received signals are respectively fed to radio frequency amplifiers which are tuned to the frequency of the associated antenna. The remainder of the receiving portion of the system (including the tuned amplifiers) is the same as that shown in FIG. 4, so further illustration and description is believed unnecessary.

Ice thickness measurement

FIG. 6 is a block diagram of a simple airborne system for measuring ice thickness, and the system features a visual readout of ice thickness. Incidentally, the measurement of sea ice thickness poses special problems owing to the relatively high conductivity of sea ice, but fresh water ice measurement is comparatively simple since the reflection signatures exhibit strong minima representing quarter wave cancellation in ice. What is required, basically, is a system for identifying the frequency at which a minimum occurs for a particular thickness of ice.

In FIG. 6 the transmitting section includes a controllable pulser 59 for generating a voltage step function, a wide band antenna 60 which is fed by the pulser 59, such as a log planar spiral antenna, and a trigger generator 62 having a convenient repetition rate such as 10 kc./s. for controlling the pulser 59. In the present system the spectrum of the transmitted pulses includes frequency components in the range between about 186 to 558 mc./s. A TR switch 61 is provided between the transmitting and receiving sections so that the same antenna can be used for both transmitting and receiving.

Received reflected pulses are fed from the antenna 60 through the TR switch 61 to a first bank of tuned radio frequency amplifiers 63, 64, 65 and 66. The amplifier 63 is tuned to about 558 mc./s. and gives a minimum output for 3 inches of ice, the amplifier 64 is tuned to about 335 mc./s. and gives a minimum output for 5 inches of ice, the amplifier 65 is tuned to about 239 mc./s. and gives a minimum output for 7 inches of ice and the amplifier 66 is tuned to about 186 mc./s. and gives a minimum output for 9 inches of ice. As indicated above, a minimum output occurs at a frequency at which quarter wavelength cancellation occurs in the ice. The outputs of the amplifiers 63, 64, 65 and 66 are detected by diodes 67, 68, 69 and 70, respectively, fed through narrow band crystal filters 71, 72, 73 and 74 tuned to the pulser repetition rate, and thence into a minima descriminator 75 which indicates, for example by means of lamps 76, 77, 78 and 79, the amplifier which gives minimum output. Each lamp represents a thickness of ice corresponding to a particular amplifier frequency.

Ice thicknesses greater than 9" can be measured by providing similar amplifiers tuned to lower frequencies, but the following arrangement is preferred because it does not require the use of low frequency antennas. The rectified output of one of the amplifiers (in FIG. 6, the 558 mc./s. amplifier 63) is fed to a second bank of tuned radio frequency amplifiers consisting of amplifiers 80, 81, 82 and 83. The outputs of the amplifiers 80, 81, 82 and 83 are detected by diodes 84, 85, 86 and 87, respectively, filtered by crystal filters 88, 89, 90 and 91 which are tuned to the transmitter repetition rate, and are then fed to a minima detector 92 which is similar to the minima detector 75 and which controls lamps 93, 94, 95 and 96. The amplifier 80 is tuned to about 140 mc./s. and it corresponds to 12 inches of ice, the amplifier 81 is tuned to about 112 mc./s. and it corresponds to 15 inches of ice, the amplifier 82 is tuned to about 93 mc./s. and it corresponds to 18 inches of ice, and the amplifier 83 is tuned to about 70 mc./s. and it corresponds to 24 inches of ice.

An explanation for the operation of this part of the circuit is as follows. When a rectified impulse (e.g. from one of the R.F. tuned amplifiers) is fed into a lower frequency tuned amplifier (i.e. of the second bank) the low frequency tuned amplifier will ring with the natural impulse function of the tuned amplifier. If a second impulse of the same polarity is fed into the low frequency tuned amplifier following a delay which is equivalent to one half wavelength in time, the second impulse will tend to cancel the ring created by the first impulse. Thus, if a pair of impulses, representing upper and lower ice surface reflections, is fed into the tuned amplifier, a minimum output is obtained when the interval between the pulses is equivalent to one half wavelength of the frequency to which the amplifier is tuned. The rectification of the reflected signals from two layer reflectors such as lake ice apparently synthesizes low frequency components which are not present in the original pulse waveform.

This system can be installed in a light aircraft, and in operation the pilot merely makes a low pass over the like ice and observes which one of the various lamps glows predominantly. This provides him with the ice thickness, and by observing the character of the scatter in the illumination of the lamps he can estimate ice quality, the presence of slush, etc.

Sea ice poses special problems. The relatively high conductivity of sea ice, particularly when it is less than one year old, calls for the use of lower frequencies than for fresh water ice in order to achieve sufficient penetration. Layering in the sea ice with salt water entrapped between the layers provides a serious barrier to the penetration of VHF frequencies. Because of these problems and others, the terrain analysis method discussed above seems better suited to sea ice measurement than the above more simple system, since layering information as well as ice thickness information would be provided. If frequency components as low about 50 mc./s. are used, ice thicknesses of up to about 32 inches can be measured directly. Since frequencies below about 50 mc./s. require prohibitively large antennas for airborne use, the low frequency synthesis technique mentioned above could be employed. By this means it should be possible to measure substantial thicknesses of aged sea ice of low brine content. A frequency of 10 mc./s., for example, corresponds with an ice thickness of about 27 feet.

It is to be understood that the terrain analysis and ice thickness measurement systems described above are mentioned by way of example only: other applications of the invention will readily come to mind. For example, one application might be the identification of particular kinds of aircraft by examining the signatures of reflected pulses. Each aircraft of a particular configuration would uniquely determine the reflection signature of pulses reflected from its various surfaces. Probably X-band radar frequencies would be most suitable for this application.

Studies of the lunar crust might be another application. In this case, expandable metal tape antennas of 100 feet or more in length, which have already been successfully used in space, could be used to propagate (from a satellite, for example) pulses having frequency components extending into the low megacycle region of the radio spectrum. Penetrations of hundreds of feet may be possible if the expected conditions of very high resistivity and low dielectric constant prevail.

What I claim as my invention is:

1. A method of investigating structural geometry of a remote reflecting body, comprising the steps of:
    (a) generating frequency modulated pulses of broad frequency dispersion at a uniform rate of repetition,
        (i) each of said pulses being of identical frequency composition and including frequencies that are respectively high enough and low enough to produce interference between waves reflecting from boundaries of said reflecting body,
    (b) transmitting said pulses towards said reflecting body from a source remote from said reflecting body,
        (i) the duration of each of said pulses being less than the travel time of said pulses from said source to said reflecting body and back to said source,
    (c) receiving said pulses after they have been reflected from said reflecting body, said pulses being received at a position constantly kept in close proximity with said source, each received pulse having a unique signature that is characteristic of the structural geometry of the reflecting body,
        (i) the repetition rate of said pulses being such that any given reflected pulse is received before the next succeeding pulse is generated,
    (d) amplifying the received pulses,
    (e) separating the received pulses into a plurality of distinct components,
    (f) measuring the amplitudes of each of the separated components, and recording the separated components of the received pulses, and
    (g) comparing the relative amplitudes of the separated components with the relative amplitudes of similar components derived from a reflecting body of known structural geometry.

2. A method of estimating terrain trafficability from an aircraft flying over the terrain, comprising:
    (a) generating frequency modulated pulses of broad frequency dispersion at a uniform rate of repetition,
        (i) each of said pulses being of identical frequency composition and including frequencies in the range between about 50–400 mc./s., said pulses suffering interference when reflected from near surface layers of said terrain,
        (ii) the duration of each of said pulses being less than the travel time of said pulses from said aircraft to said terrain and back to said aircraft,
    (b) transmitting said pulses towards the terrain directly beneath the aircraft,
    (c) receiving said pulses after they have been reflected from the terrain beneath the aircraft, each received pulse having a unique signature that is characteristic of the terrain beneath the aircraft,
        (i) the repetition rate of said pulses being such that any given reflected pulse is received before the next succeeding pulse is generated,
    (d) amplifying the received pulses,
    (e) separating the received pulses into a plurality of different frequency components, and
    (f) measuring and recording the measured, separated components of the received pulses so that the approximate frequencies at which interference has occurred can be determined.

3. A method of estimating terrain trafficability as claimed in claim 2 wherein said pulses are generated by shock exciting a wide band antenna.

4. A method of estimating terrain trafficability as claimed in claim 2 wherein said pulses are generated by triggering contemporaneously a plurality of controllable pulsers of different frequencies in the range between about 50–400 mc./s.

5. A method of measuring ice thickness from a moving vehicle comprising:
    (a) generating frequency modulated pulses of broad frequency dispersion at a uniform rate of repetition,
        (i) each of said pulses being of identical frequency composition, and including frequencies that are respectively high enough and low enough to produce interference between waves reflecting from the upper and lower surfaces of the ice,
        (ii) the duration of each of said pulses being less than the travel time of said pulses from said vehicle to the ice and back to said vehicle,
    (b) transmitting said pulses towards the ice,
    (c) receiving said pulses after they have reflected from the ice,
        (i) the received pulses including components that have respectively been reflected from the upper and lower surfaces of the ice,
        (ii) the repetition rate of said pulses being such that any given reflected pulse is received before the next successive pulse is generated,
    (d) amplifying the received pulses,
    (e) separating the received pulses into a plurality of different frequency components, and
    (f) comparing the amplitudes of the said different frequency components to determine the approximate frequency at which quarter wave cancellation occurs whereby the thickness of the ice is determined.

6. Apparatus for investigating structural geometry of a remote reflecting body, comprising:
    (a) means for generating frequency modulated pulses of broad frequency dispersion at a uniform rate of repetition,
        (i) each of said pulses being of identical frequency composition and including frequencies that are respectively high enough and low enough to produce interference between waves reflecting from boundaries of said reflecting body.
    (b) means for transmitting said pulses towards said reflecting body from a source remote from said reflecting body,
        (i) the duration of each of said pulses being less than the travel time of said pulses from said source to said reflecting body and back to said source,
    (c) means for receiving said pulses after they have have been reflected from said reflecting body, said pulses being received at a position constantly kept in close proximity with said source, each received pulse having a unique signature that is characteristic of said reflecting body,
        (i) the repetition rate of said pulses being such that any given reflected pulse is received before the next succeeding pulse is generated,
    (d) means for amplifying the received pulses,
    (e) means for separating the received pulses into a plurality of different components,
    (f) means for measuring the amplitudes of each of said separated components,
    (g) means for comparing the relative amplitudes of said separated components to determine the approximate frequencies at which interference has occurred.

7. Apparatus for investigating structural geometry of a reflecting body as claimed in claim 6 wherein the generating means includes a plurality of single frequency transmitters, means for triggering said transmitters contemporaneously at a uniform rate of repetition to form a plurality of single frequency pulses of short duration and each of a different frequency, said transmitters including a transmitter operating at a lowest frequency and another transmitter operating at a highest frequency, the ratio between the highest and lowest frequencies being at least about 6:1, and means for radiating said pulses contemporaneously by means of radiators constantly kept in close proximity to each other whereby the resulting radiation constitutes a repetition of identical frequency modulated pulses of broad frequency dispersion.

8. Apparatus for investigating structural geometry of a remote reflecting body as claimed in claim 6 wherein the generating means includes means for generating a series of abrupt impulse function pulses each having a rise time of the order of one nonosecond, said pulses being generated at a uniform rate of repetition, and a broadband antenna connected with said generating means, said antenna having a frequency response of between about 50–400 mc./s.

9. Apparatus for estimating terrain trafficability from an aircraft flying over the terrain, comprising:
  (a) means for generating frequency modulated pulses of broad frequency dispersion at a uniform rate of repetition,
    (i) each of said pulses being of identical frequency composition and including frequencies in the range between about 50–400 mc./s., said pulses suffering interference when reflected from near surface layers of said terrain,
    (ii) the duration of each of said pulses being less than the travel time of said pulses from said aircraft to said terrain and back to said aircraft,
  (b) means for transmitting said pulses towards the terrain directly beneath the aircraft,
  (c) means for receiving said pulses after they have been reflected from the terrain beneath the aircraft, each received pulse having a unique signature that is characteristic of the terrain beneath the aircraft,
    (i) the repetition rate of said pulses being such that any given reflected pulse is received before the next succeeding pulse is generated,
  (d) means for amplifying the received pulses,
  (e) means for separating the received pulses into a plurality of different frequency components, and
  (f) means for measuring and recording the separated components of the received pulses so that the approximate frequencies at which interference has occurred can be determined.

10. Apparatus for measuring ice thickness from a moving vehicle, comprising:
  (a) means for generating frequency modulated pulses of broad frequency dispersion at a uniform rate of repetition,
    (i) each of said pulses being of identical frequency composition and including frequencies that are respectively high enough and low enough to produce interference between waves reflecting from the upper and lower surfaces of the ice,
    (ii) the duration of each of said pulses being less than the travel time of said pulses from said vehicle to the ice and back to said vehicle,
  (b) means for transmitting said pulses towards the ice,
  (c) means for receiving said pulses after they have been reflected from the ice,
    (i) the received pulses including components that have respectively been reflected from the upper and lower surfaces of the ice,
    (ii) the repetition rate of said pulses being such that any given reflected pulse is received before the next successive pulse is generated,
  (d) means for amplifying the received pulses,
  (e) means for separating the received pulses into a plurality of different frequency components, and
  (f) means for comparing the amplitudes of said different frequency components to determine the approximate frequency at which quarter wave cancellation occurs whereby the thickness of the ice is determined.

11. Apparatus for measuring ice thickness as claimed in claim 10 wherein said pulses contain frequencies of between about 180–560 mc./s.; wherein said means for separating the received pulses includes a first bank of radio frequency amplifiers which are respectively tuned to different frequencies in the range between about 180–560 mc./s.; and wherein said amplitude comparing means includes means for identifying the particular tuned amplifier having a minimum output.

12. Apparatus for measuring ice thickness as claimed in claim 11 wherein the means for separating the received pulses further includes a second bank of radio frequency amplifiers which are respectively tuned to different frequencies in the range between about 50–140 mc./s., said second bank of amplifiers being fed by the output of one of the amplifiers of said first bank, and wherein additional means is provided for identifying the particular tuned amplifier of said second bank having a minimum output.

13. Apparatus for measuring ice thickness as claimed in claim 12 wherein said first bank of amplifiers includes amplifiers which are respectively tuned to frequencies of approximately 558, 335, 239 and 186 mc./s., corresponding, respectively, to ice thicknesses of 3, 5, 7 and 9 inches, and wherein the second bank of amplifiers includes amplifiers which are respectively tuned to frequencies of 140, 112, 93 and 70 mc./s., corresponding, respectively, to ice thicknesses of 12, 15, 18 and 24 inches.

References Cited by the Examiner

UNITED STATES PATENTS

| | | | |
|---|---|---|---|
| 2,539,594 | 1/1951 | Rines et al. | 343—18 |
| 2,568,408 | 9/1951 | Peterson | 325—154 |
| 2,659,882 | 11/1953 | Barrett | 343—12 |
| 2,705,319 | 3/1955 | Dauber | 343—17.2 X |
| 3,029,429 | 4/1962 | Rodgers | 343—11 X |
| 3,140,489 | 7/1964 | Downie | 343—17.2 |
| 3,212,053 | 10/1965 | Finney | 343—17.2 X |
| 3,243,771 | 3/1966 | Roark et al. | 340—15.5 |

RODNEY D. BENNETT, *Primary Examiner.*

CHESTER L. JUSTUS, *Examiner.*

J. P. MORRIS, *Assistant Examiner.*